April 8, 1969 M. C. HENDERSON ET AL 3,437,872

CATHODE RAY TUBE PROTECTION APPARATUS

Filed Jan. 23, 1967

INVENTOR.
MARTIN C. HENDERSON
JOHN E. HIGBEE
BY Lindenberg & Freilich
ATTORNEYS 3,437,872

CATHODE RAY TUBE PROTECTION APPARATUS

Martin C. Henderson, Canoga Park, and John E. Higbee, Santa Susana, Calif., assignors to The Bunker-Ramo Corporation, Canoga Park, Calif., a corporation of Delaware Filed Jan. 23, 1967, Ser. No. 611,100
Int. Cl. H01j 29/70, 29/76
U.S. Cl. 315—20 9 Claims

ABSTRACT OF THE DISCLOSURE

Apparatus for use in conjunction with a cathode ray tube (CRT) for preventing the CRT beam from burning a spot in the phosphor face due to failure of either the major deflection or the video system. Failure of the deflection system is sensed by AC coupling the deflection amplifiers to threshold circuits which provide a logical signal to blank the beam when the beam remains undeflected for more than a predetermined duration. Failure of the video system is sensed by monitoring the potential between the CRT grid and cathode to provide a logical signal to the anode to blank the beam when the grid-cathode potential would otherwise continuously maintain the beam unblanked.

The invention herein described was made in the course of or under a contract or subcontract thereunder, with Department of the Air Force, Rome Air Development Center.

BACKGROUND OF THE INVENTION

*Field of the invention*

This invention relates generally to display systems, as, for example of the cathode ray tube (CRT) type, and more particularly to means for use therewith for preventing the CRT beam from burning the CRT face.

All CRT's are subject to being damaged by the excessive dissipation of energy in a localized area of the phosphor face. Although the probability of damage is not usually great enough to justify special protective measures in the use of standard CRT's, the cost of a special CRT can be sufficiently high to justify very elaborate precautions.

Damages due to burning of the phosphor is usually attributable to one of two possible system failures; namely, a failure in the major deflection system or a failure in the video system. A failure in the deflection system can, of course, cause the beam to remain fixed at a single spot on the CRT face, thereby causing excessive energy dissipation and burning at that spot. A failure in the video system can cause the beam to be continuously, rather than intermittently, unblanked to thus also cause excessive dissipation and burning.

*Summary of the invention*

In accordance with the present invention, means are provided for protecting the CRT face to prevent burning.

Briefly, the present invention is based on the recognition that conditions associated with the primary causes of CRT burning can be continually monitored to blank the CRT beam when a failure is indicated.

In accordance with one aspect of the present invention, monitoring means are provided which control beam blanking through the utilization of a CRT electrode not normally used for blanking.

In accordance with a further aspect of the present invention, video system failure is monitored by continually sensing the potential across the CRT electrodes normally used for blanking and by controlling an electrode not normally used for blanking. Thus, in the preferred embodiment of the invention, the potential across the CRT grid and cathode is monitored and a first anode potential is controlled to enable it to blank the beam despite the grid and cathode defining an unblanking potential.

In accordance with a further aspect of the present invention, means are provided for monitoring the deflection signal provided to the major deflection means and, in the event the signals are not varying, thus indicating that the beam is stationary, for causing the beam to be blanked.

Figure 1:
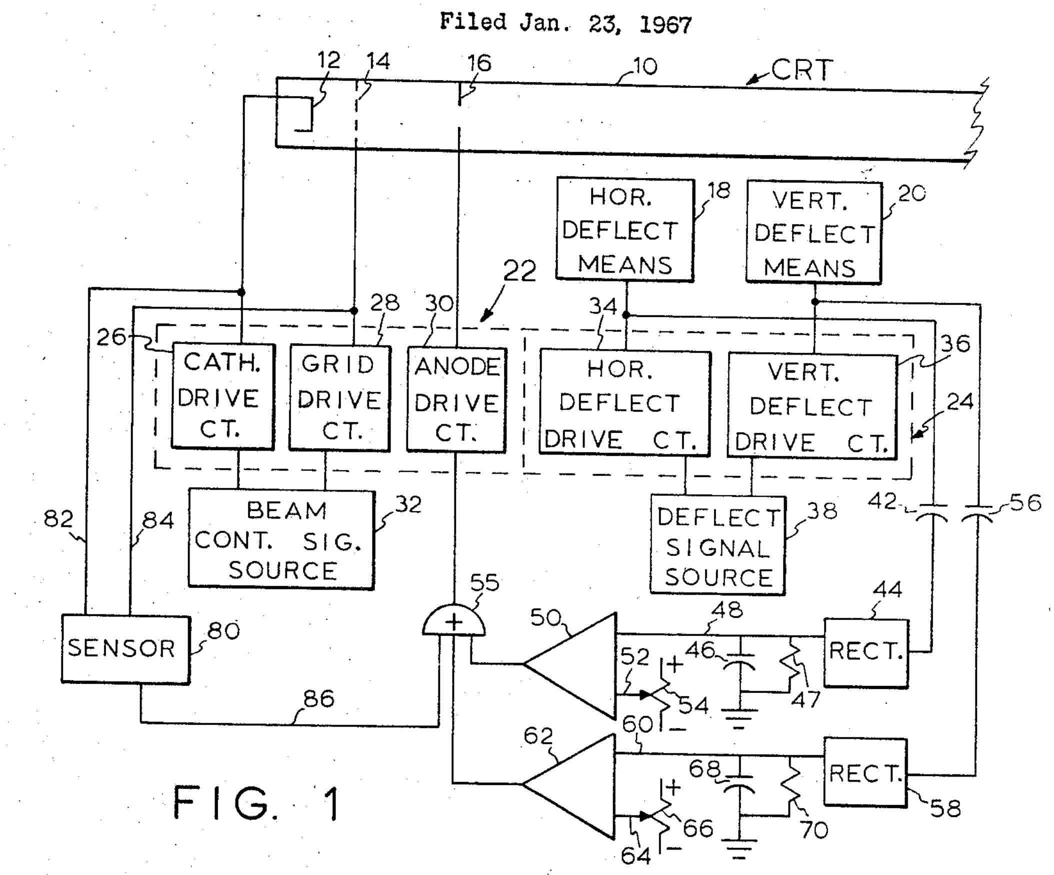
FIGURE 1 is a block schematic diagram of a CRT display system incorporating protection means in accordance with the present invention.

Attention is now called to FIG. 1, which illustrates a cathode ray tube (CRT) 10 which can be used in a conventional manner to display various types of information. As is well known, displays are formed by producing an electron beam within the tube 10 and accelerating it toward the CRT face (not shown). A layer of material, such as phosphor, is disposed on the tube face. Wherever the beam strikes the phosphor coating, a light spot will be developed.

More particularly, the CRT 10 is provided with an electron gun structure including a cathode electrode 12, a grid electrode 14, and an anode electrode 16. Although other electrodes may be provided, as, for example, for focusing, such other electrodes are not specifically utilized in conjunction with the present invention and accordingly will not be discussed herein.

In addition to the aforementioned electrodes 12, 14, and 16, a horizontal deflection means 18 and a vertical deflection means 20 are normally associated with the CRT 10. The deflection means 18 and 20 can comprise coils for developing orthogonal magnetic fields for respectively deflecting the beam horizontally and vertically. In this manner, the beam can be deflected to define virtually any pattern on the CRT face, which pattern will, of course, be illuminated as a consequence of the beam correspondingly striking the phosphor coating.

In the normal utilization of the CRT 10, the electrodes 12, 14, and 16 are controlled by electron gun drive circuitry 22. The horizontal and vertical deflection means 18 and 20 are controlled in response to major deflection drive circuitry 24.

The drive circuitry 22 is comprised of a cathode drive circuit 26, a grid drive circuit 28, and an anode drive circuit 30. The drive circuits 26 and 28 are controlled in response to signals provided by a beam control signal source 32. Thus, for example, the beam control signal source 32 will cause the cathode drive circuit 26 to apply one potential to the cathode 12 when the beam is to be unblanked and another potential to the cathode 12 when the beam is to be blanked. For example, a +60 volt potential can be applied to cathode 12 in order to create a large potential gradient from anode to cathode to unblank the beam and a +100 volt potential can be applied to the cathode to reduce the gradient in order to blank the beam. The beam intensity can be controlled by the potential applied to the grid electrode 14 by the grid drive circuit 28. Thus, in order to increase beam intensity, the potential applied to grid 14 by the drive circuit 28 is increased toward +60 volts, for example. In order to decrease beam intensity, the grid potential is lowered to somewhere considerably below +60 volts.

The anode drive circuit 30 normally applies high positive potential to the anode 16 sufficient to accelerate electrons provided by the cathode 12 toward the anode 16 and through to the CRT face (not shown).

The deflection means 18 and 20 are respectively responsive to drive circuits 34 and 36 which are controlled in response to signals provided by a deflection signal source 38. As previously pointed out, operation of the deflection means enables the beam to be deflected in accordance with substantially any desired pattern.

It is well known that the electron beam can damage the CRT face by burning a portion of the phosphor coating thereon if an excessive amount of beam energy is dissipated in a localized area of the phosphor. The probability of damage is usually not great enough to justify the utilization of special protective means in the case of standard CRT's. However, where very expensive CRT's are utilized, their cost often justifies fairly elaborate protection precautions.

Burning usually occurs in response to a failure in either the video system comprised of the source 32 and drive circuits 26 and 28 or in the major deflection system comprised of the source 38 and drive circuits 34 and 36. More particularly, a failure in the video system may cause the potential between the cathode 12 and grid 14 to be reduced to a very small value, which in turn develops a very high intensity beam. If the beam persists in this condition for too long a duration, burning can occur. On the other hand, a failure in the deflection system may cause the beam to remain stationary, thereby in turn causing excessive energy dissipation at a localized area of the phosphor.

The present invention is directed toward means for recognizing these two possible system failures and for blanking the beam when such a failure is detected.

Briefly, in accordance with the present invention, a failure in the deflection system is detected by sensing the rate of change of either one or both of the deflection signals and comparing this rate of change with a threshold level. If the rate of change of the deflection signal is less than the threshold level, then a blanking signal is applied to the anode drive circuit 30 to remove the accelerating potential from the anode 16.

More particularly, the horizontal deflection signal provided by the drive circuit 34 to the deflection means 18 is coupled through an AC coupling means such as a capacitor 42 to the input of a full wave rectifier 44. The output of the rectifier is applied to an energy storage device such as a capacitor 46. The storage level of the capacitor 46 is applied to an input terminal 48 of a comparing means such as a differential amplifier 50. A second input terminal 52 of the amplifier 50 is connected to the tap of a potentiometer 54.

Therefore, in response to each change in the level of the deflection signal provided by the drive circuit 34, the capacitor 42 will couple a pulse to the rectifier 44. Regardless of the polarity of pulses applied to the rectifier 44, the output of the rectifier 44 will tend to charge the capacitor 46 in a single direction. The capacitor will, of course, tend to discharge through the resistor 47 at a rate determined by the value of the capacitor 46 and resistor 47. It will be appreciated that, as a consequence of the rectifier 44 providing energy to the capacitor 46 which discharges through the resistor 47, the energy level of the capacitor 46 will continually represent a time averaging of the pulses coupled through capacitor 42. In other words, the potential across the capacitor 46 represents the rate of change of the deflection signal provided by the drive circuit 34.

The potential across the capacitor 46 is applied to the input terminal 48 of differential amplifier 50, which compares the capacitor potential to the threshold level provided by potentiometer 54. When the potential on terminal 48 falls below the established threshold level on the terminal 52, the amplifier 50 will provide a logical signal to the OR gate 55, causing the drive circuit 30 to remove the accelerating potential from the anode 16. As a consequence, the beam will be blanked.

The rate of change of the vertical deflection signal provided by the drive circuit 36 can be similarly monitored by coupling the output of drive circuit 36 through capacitor 56 to the rectifier 58. The output of rectifier 58 is connected to the input terminal 60 of amplifier 62. Input terminal 64 is connected to a tap of potentiometer 66. The output terminal of rectifier 58 is connected to ground through the parallel RC circuit comprised of capacitor 68 and resistor 70. The output of amplifier 62 is also connected to the input of OR gate 55.

Thus, with the illustrative configuration illustrated in FIG. 1, it will be apparent that if the rate of change of either the horizontal or vertical deflection signals falls below a certain threshold level established by the potentiometers, the beam will be blanked. It is recognized that in many actual applications the beam should be blanked only when the rate of change of both the deflection signals falls below the threshold level. In order to introduce this modification, it is merely necessary to provide an AND gate (not shown) between the output of amplifiers 50 and 62 and the input to OR gate 55. The AND gate would provide a blanking signal to OR gate 55 only when the rate of change of both deflection signals, as indicated by the output of amplifiers 50 and 62, is below the threshold level. On the other hand, in other applications, it may only be necessary to sense the rate of change of one of the deflection signals. For example, where the CRT is being utilized to display text material, the vertical deflection signal may remain constant for relatively long periods of time as the beam is scanned across a line of characters. Since it is not desired to blank the beam in this circumstance, it would be unnecessary to monitor the output of the vertical deflection means as shown in FIG. 1.

It will be recalled that it is desired to protect the CRT in the event of video system failure as well as deflection system failure. As previously noted, the grid 14 and cathode 12 are normally utilized in the configuration of FIG. 1 to control the blanking and intensity of the beam. Normally the potential on the grid 14 will be considerably below the unblanking potential applied to the cathode 12. In the event the potential on the grid 14 increases toward the unblanking cathode potential and remains there for longer than a predetermined duration, it is desirable to blank the beam. In order to achieve this result, a sensor device 80 is provided having first and second input terminals 82 and 84 respectively connected to the outputs of drive circuits 26 and 28. When the potential across the terminals 82 and 84 falls below a certain level, the sensor device 80 provides a logical signal on the output terminal 86 to the OR gate 55, which in turn will remove the accelerating potential from the anode 16 to thus blank the beam.

Figure 2:
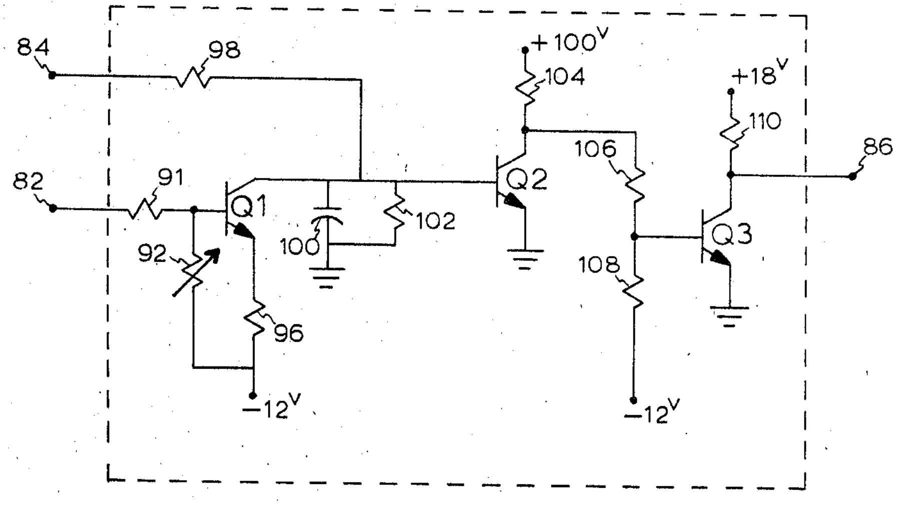
FIG. 2 is a schematic circuit diagram illustrating circuit details of a preferred embodiment of the sensor illustrated in FIG. 1.

Attention is now called to FIG. 2, which illustrates a preferred embodiment of the sensor device 80 of FIG. 1. The sensor device includes a first transistor Q1, illustrated as being of the NPN type. The base of transistor Q1 is connected through a resistor 91 to the input terminal 82, which it will be recalled is connected to the cathode 12. Additionally, the base of transistor Q1 is connected through a variable resistor 92 to a source of negative reference potential, e.g., —12 volts. The emitter of transistor Q1 is connected through resistor 96 to the same source of negative reference potential. The input terminal 84 is connected through a resistor 98 to the collector of transistor Q1. The collector of transistor Q1 is additionally connected through capacitor 100 and resistor 102 connected in parallel therewith to ground.

Additionally, the collector of transistor Q1 is connected to the base of NPN transistor Q2. The emitter of transistor Q2 is connected to ground, and the collector thereof is connected through resistor 104 to a source of positive potential, e.g., 100 volts. The collector of transistor Q2 is connected through a voltage divider comprised of resistors 106 and 108, connected in series, to a source of negative potential, e.g., —12 volts. The junction between resistors 106 and 108 is connected to the base of an NPN transistor Q3 whose emitter is connected to ground. The collector of transistor Q3 is connected through resistor 110 to a source of positive potential, e.g., +18 volts. The collector of transistor Q3 comprises the output terminal 86 of the sensor device 80 shown in FIG. 1.

In the operation of the sensor device of FIG. 2, when both the drive circuit 26 and the drive circuit 28 of FIG. 1 are operating normally, the level of the signal applied to terminal 84 is considerably below the level of the signal applied to terminal 82. More particularly, consider the condition when the beam is blanked and the cathode 12 is at the exemplary +100 volt level. Under these conditions, the transistor Q1 will be conducting heavily, drawing current from terminal 84 through resistor 98 and preventing the charge across capacitor 100 from building positive. Rather, with the +100 volt blank signal applied to the input terminal 82, the potential at the collector of transistor Q1 will be slightly negative and will thus hold the transistor Q2 off. Even for a worst case condition, e.g., when the beam is unblanked (i.e., +60 volts on the cathode), about 80% of the time, the potential at the collector of transistor Q1 can be held slightly negative by proper adjustment of variable resistor 92. It will be appreciated that if the grid drive signal applied to terminal 84 then suddenly goes too far positive, i.e., closer to the cathode potential, for a sufficient duration, the capacitor 100 will charge up to thereby turn transistor Q2 on. On the other hand, if the +60 volt unblank level applied to the cathode persists for 100%, rather than 80%, of the time, the capacitor 100 will also charge up to likewise turn transistor Q2 on.

As a consequence of transistor Q2 turning on, transistor Q3 will turn off, thus causing the potential on the collector of transistor Q3 to increase to substantially +18 volts. The +18 volt potential applied to output terminal 86 will enable the OR gate 55 to remove the accelerating potential from anode 16 and blank the beam.

From the foregoing, it should be appreciated that circuit apparatus has been disclosed herein for protecting a CRT by preventing the CRT beam from burning the phosphor coating on the CRT face. Protection is accomplished by monitoring the two primary system failures which result in tube damage by burning. More particularly, failure of the major deflection system is detected by monitoring the rate of change of the deflection signal and blanking the beam when the rate of change falls below a threshold level. Failure of the video system is detected by monitoring the potential difference between the cathode and grid electrodes and by blanking the beam by removing the accelerating potential from one of the other electrodes, e.g., the anode, when the grid-cathode potential falls below a threshold level.

The embodiments of the invention in which an exclusive property or privilege is claimed are defined as follows:

1. In combination with a cathode ray tube including deflection means responsive to the application of a deflection signal thereto for deflecting the tube beam, a system for protecting said tube to prevent excessive localized energy dissipation on the face thereof, said system comprising:

means including an energy storage means for monitoring said deflection signal to sense the rate of amplitude change thereof;

means for establishing a theshold rate of amplitude change;

means for blanking said beam in response to said deflection signal rate of change being less than said threshold rate of change;

a coupling circuit connected to said energy storage means; and means applying said deflection signal to said coupling circuit.

2. The combination of claim 1 wherein said means for blanking includes a comparing means; and means coupling both said energy storage circuit and said means for establishing said threshold rate of change to said comparing means.

3. The combination of claim 2 wherein said cathode ray tube has a plurality of beam controlling electrodes and means coupling said comparing means to one of said electrodes for blanking said beam.

4. The combination of claim 2 wherein said energy storage means includes a capacitor; and wherein said comparing means includes a differential amplifier having first and second input terminal; and means respectively coupling said capacitor and said means for establishing said threshold rate of change to said first and second input terminals.

5. In combination with a cathode ray tube having a beam producing and a plurality of beam controlling electrodes and means applying a control signal between said beam producing and at least a first of said beam controlling electrodes for controlling the beam intensity, a system for preventing excessive localized energy dissipation on the face of said tube, said sytem comprising:

means for sensing the amplitude of said control signal;

means for establishing a control signal threshold;

means for comparing said control signal amplitude with said control signal threshold; and means responsive to said means for comparing for controlling the potential applied to a second of said beam controlling electrodes.

6. In combination with a cathode ray tube having at least first, second, and third electrodes and means for applying beam control signals to said first and second electrodes, a system for preventing excessive localized energy dissipation on the face of sad tube, said system comprising:

a sensing circuit having first and second input terminals and an output terminal and responsive to less than a predetermined potential across said input terminals for providing a first blanking signal at said output terminal;

means respectively coupling said first and second electrodes to said first and second input terminals; and means coupling said output terminal to said third electrode.

7. The combination of claim 6 wherein said sensing circuit includes a first transistor having an emitter, collector, and base;

means respectively connecting said first and second input terminals to said first transistor base and emitter; and means connecting said first transistor collector to said output terminal.

8. The combination of claim 6 including a major deflection means;

a source of deflection signal;

means applying said deflection signal to said major deflection means; and means for monitoring said deflection signal to determine the rate of change thereof.

9. The combination of claim 8 including means for establishing a threshold rate of change;

means providing a second blanking signal in response to said deflection signal rate of change being less than said threshold rate of change; and means applying said second blanking signal to said third electrode.

References Cited

UNITED STATES PATENTS 2,709,768 5/1955 King ---------------- 315—20

RODNEY D. BENNETT, Jr., *Primary Examiner.*

BRIAN E. RIBANDO, *Assistant Examiner.*